(12) United States Patent
Lepelletier (10) Patent No.: US 7,699,744 B2
(45) Date of Patent: Apr. 20, 2010

(54) MULTI-SPEED AUTOMATIC TRANSMISSION FOR PRIVATE CARS OR COMMERCIAL VEHICLES

(75) Inventor: Pierre Lepelletier, Chatou (FR)

(73) Assignee: SC Brevets Lepelletier, Chatou (FR)

( * ) Notice: Subject to any disclaimer, the term of this patent is extended or adjusted under 35 U.S.C. 154(b) by 467 days.

(21) Appl. No.: 11/597,050

(22) PCT Filed: May 20, 2005

(86) PCT No.: PCT/FR2005/001271

§ 371 (c)(1),
(2), (4) Date: Nov. 20, 2006

(87) PCT Pub. No.: WO2005/124190

PCT Pub. Date: Dec. 29, 2005

(65) Prior Publication Data

US 2007/0232436 A1    Oct. 4, 2007

(30) Foreign Application Priority Data

May 21, 2004   (FR) ................................... 04 05536

(51) Int. Cl.
*F16H 3/62* (2006.01)
(52) U.S. Cl. .................. 475/278; 475/275; 475/330
(58) Field of Classification Search ............... 475/275, 475/278, 286, 287, 289, 302, 330
See application file for complete search history.

(56) References Cited

U.S. PATENT DOCUMENTS

| 5,106,352 | A | 4/1992 | Lepelletier |
| 2003/0186775 | A1 | 10/2003 | Ishimasu et al. |
| 2004/0116238 | A1 | 6/2004 | Ziemer |

FOREIGN PATENT DOCUMENTS

| EP | 0434525 | 6/1991 |
| EP | 1390642 | 2/2004 |
| WO | 02/079671 | 10/2002 |

*Primary Examiner*—David D Le
(74) *Attorney, Agent, or Firm*—Young & Thompson (57) ABSTRACT

A multi-speed automatic transmission for private cars or commercial vehicles includes input and output shafts, two power paths, a double planetary gear train, first and second brakes. The first power path has a first speed ratio and includes first and second clutches. The second power path has a second speed ratio, which is greater than the first speed ratio and in the same direction, with third and fourth clutches. The transmission has eight forward and two reverse speeds and is highly flexible. In one embodiment, the transmission is reduced to six forward and one reverse speed without the second clutch. In another embodiment, the input and output shafts are aligned and the ratios are supplied respectively by a planetary gear train and a direct drive. In another embodiment, the input and output shafts are parallel and the ratios are supplied respectively by two parallel gear trains including constant mesh gears.

16 Claims, 4 Drawing Sheets

Fig.1

| | AR2 | AR1 | PMF | 1 | 2 | 3 | 4 | 5 | 6 | 7 | 8 |
|---|---|---|---|---|---|---|---|---|---|---|---|
| C1 | | | | ● | ● | ● | ● | ● | | | |
| C2 | | ● | | | | ● | | | | ● | |
| C3 | | | | | | | | ● | ● | ● | ● |
| C4 | ● | | | | | | ● | | ● | | |
| B1 | ● | ● | ● | ● | | | | | | | |
| B2 | | | ● | | ● | | | | | | ● |

| | AR | PMF | 1 | 2 | 3 | 4 | 5 | 6 |
|---|---|---|---|---|---|---|---|---|
| C1 | | | • | • | • | • | | |
| C3 | | | | | | • | • | • |
| C4 | • | | | | | • | • | |
| B1 | • | • | • | | | | | |
| B2 | | • | | • | | | | • |

MULTI-SPEED AUTOMATIC TRANSMISSION FOR PRIVATE CARS OR COMMERCIAL VEHICLES

BACKGROUND OF THE INVENTION

1. Field of the Invention

The present invention relates to automatic transmissions, in particular for automobile vehicles, comprising planetary gearsets controlled by friction members such as clutches and brakes, and usually coupled to a start-up coupling device subject to slip, such as a torque converter generally provided with a lock-up clutch, or sometimes a simple clutch.

2. Description of the Related Art

The recent development of these transmissions shows a marked tendency to increase the number of speeds, quite commonly six. The patent EP 0434525 B1 has described such a transmission comprising, between an input shaft and an output shaft housed in a casing, a so-called double planetary gearset with four members identified from first to fourth in order of speed, concentric with the output shaft, and at least one power path between the input shaft and the double planetary gearset, and five control devices, that is to say three clutches and two brakes of which the selective operation in pairs determines various transmission ratios between the input shaft and the output shaft, a first power path having a first fixed speed ratio and including a first clutch and a second clutch, and a second power path having a second fixed speed ratio, higher than the first fixed speed ratio and in the same direction, and including a third clutch. The first member of the double planetary gearset is connected to the first power path by the first control clutch. The second member is fixed to the output shaft. The third member is connected to the second power path by the third control clutch and held against rotation by the first brake. The fourth member is connected to the first power path by the second control clutch and held against rotation by the second brake. Selective operation in pairs of the five control devices provides six forward gears, i.e. a first, by the first control clutch and the first control brake, a second, by the first control clutch and the second control brake, a third, by the first and second control clutches, a fourth by the first and third control clutches, a fifth, by the second and third control clutches, a sixth by the third control clutch and the second control brake, a braked neutral position, by the first and second control brakes, and a reverse drive, by the second control clutch and the first control brake.

This transmission has been widely adopted by automobile vehicle manufacturers.

It has been proposed to modify the six-speed transmission of EP 0434525 in order to produce a transmission with seven or more speeds (see Prof.-Dr. Peter Tenberge, in Der E-Automat, Ein Automatikgetriebe mit Esprit, Dec. 2001). This transmission with seven or more speeds has serious drawbacks, in particular as regards the progression of steps of the ratios.

SUMMARY OF THE INVENTION

According to a first aspect of the invention, an eight speed automatic transmission is provided comprising a minimum of components and having, among other things, a good progression of steps of the ratios.

To that end, according to this first aspect of the invention, there is more particularly provided a multispeed automatic transmission, in particular for automobile vehicles, comprising between an input shaft and an output shaft housed in a casing, a so-called double planetary gearset with four members identified from first to fourth in order of speed, concentric with the output shaft, two power paths between the input shaft and the double planetary gearset and five control devices, i.e. three clutches and two brakes of which the selective operation in pairs determines various transmission ratios between the input shaft and the output shaft, the first power path having a first fixed speed ratio and comprising the first and the second clutches and the second power path having a second fixed speed ratio greater than the first ratio and in the same direction, and comprising the third clutch, the first member of the double planetary gearset being connected to the first power path by the first clutch, the second member being fixed to the output shaft, the third member being connected to the second power path by the third clutch and held against rotation by the first brake, and the fourth member being connected to the first power path by the second clutch and held against rotation by the second brake, which transmission is characterized in that it comprises a fourth clutch connecting the fourth member to the second power path and constituting a sixth control device, such that selective operation in pairs of the six control devices provides eight forward gears: a first, by the first clutch and the first brake; a second by the first clutch and the second brake, a third by the first and second clutches; a fourth by the first and fourth clutches; a fifth by the first and third clutches; a sixth in direct drive by the third and fourth clutches; a seventh by the second and third clutches; an eighth by the third clutch and the second brake; a braked neutral position by the first and second brakes; a first reverse drive by the second clutch and the first brake; and a second reverse drive by the fourth clutch and the first brake.

Advantageously in a transmission according to this first aspect of the invention, depending on whether the input and output shafts are aligned or parallel, the fixed speed ratios of the two power paths are provided by a three-member planetary gearset having a member fixed to the casing and by a direct drive, or by two parallel gearsets of constant-mesh gearwheels.

Advantageously, the input and output shafts being aligned, the first power path comprises a planetary gearset with three members of which one is fixed to the casing, defining the first fixed speed ratio less than one, whereas the second power path is in direct drive defining the second fixed speed ratio equal to one.

Advantageously furthermore, the three-member planetary gearset comprises a planet carrier fixed to the input shaft carrying planet pinions meshed with each other and respectively with a ring gear and with a sun gear fixed to the casing, the ring gear forming the first power path of fixed ratio less than one comprising the first control clutch and the second control clutch and the input shaft and the planet carrier forming the second power path in direct drive of fixed ratio equal to one comprising the third control clutch and the fourth control clutch.

According to an advantageous embodiment, the double planetary gearset comprises a three-member planetary gearset having a planet carrier carrying planet pinions meshed with a sun gear and with a ring gear and additional planet pinions meshed with the planet pinions and with an additional sun gear, the first member being constituted by the additional sun gear, the second member being constituted by the ring gear, the third member being constituted by the planet carrier, and the fourth member being constituted by the sun gear.

According to another advantageous embodiment, the double planetary gearset comprises a three-member planetary gearset having a planet carrier carrying planet pinions meshed with a sun gear and with a ring gear, and another three-member gearset having a planet carrier carrying planet pinions meshed with each other and respectively with a ring gear and a sun gear, the first member being constituted by the sun gear, the second member being constituted by the ring gears fixed together for rotation, the third member being constituted by the planet carriers fixed together for rotation, and the fourth member being constituted by the sun gear.

According to an advantageous embodiment, the three-member planetary gearset comprises a planet carrier fixed to the input shaft carrying planet pinions meshed with each other and respectively with a ring gear and with a sun gear connected to a control brake for the control of the first power path, the ring gear forming that first power path of fixed ratio less than one comprising the first control clutch and the second control clutch, and the input shaft and the planet carrier forming the second power path in direct drive of fixed ratio equal to one comprising the third control clutch and the fourth control clutch.

According to another advantageous embodiment, the input and output shafts being parallel, on the one hand the first power path and the second power path each comprise a parallel gearset, with constant-mesh gearwheels, respectively defining the first fixed speed ratio and the second fixed speed ratio greater than the first ratio and in the same direction, and on the other hand the double planetary gearset comprises a three-member planetary gearset having a planet carrier carrying planet pinions meshed with a sun gear and with a ring gear and another three-member gearset having a planet carrier carrying planet pinions meshed with a sun gear and with a ring gear, the first member being constituted by the ring gear, the second member being constituted by the ring gear and the planet carrier fixed together for rotation, the third member being constituted by the planet carrier and the fourth member being constituted by sun gears fixed together for rotation.

According to another aspect of the invention, the architecture of the multi-speed transmission is adapted to make a new transmission with six forward speeds and one reverse drive by omitting the second control clutch of the transmission with eight forward speeds and two reverse drives.

According to this aspect of the invention, a multi-speed automatic transmission is provided which comprises between an input shaft and an output shaft housed in a casing, a so-called double planetary gearset with four members identified from first to fourth in order of speed, concentric with the output shaft, two power paths between the input shaft and the double planetary gearset and five control devices, i.e. three clutches and two brakes of which the selective operation in pairs determines various transmission ratios between the input shaft and the output shaft, the first power path having a first fixed speed ratio and comprising the first clutch and the second power path having a second fixed speed ratio greater than the first ratio and in the same direction and comprising the second clutch, the first member of the double planetary gearset being connected to the first power path by the first clutch, the second member being fixed to the output shaft, the third member being connected to the second power path by the second clutch and held against rotation by the first brake and the fourth member being held against rotation by the second brake, which transmission is characterized in that the fourth member is connected to the second power path by the third clutch so as to obtain by selective operation in pairs of the five control devices, six forward gears: a first, by the first clutch and the first brake; a second by the first clutch and the second brake; a third by the first and third clutches; a fourth by the first and second clutches; a fifth in direct drive by the second and third clutches; a sixth by the second clutch and the second brake and a reverse drive by the third clutch and the first brake.

According to an advantageous embodiment of this aspect of the invention, the input and output shafts being aligned, the first power path comprises a planetary gearset with three members of which one is fixed to the casing, defining the first fixed speed ratio less than one, whereas the second power path is in direct drive defining the second fixed speed ratio equal to one.

Similarly, according to this embodiment of this aspect of the invention, the three-member planetary gearset may comprise a planet carrier fixed to the input shaft bearing planet pinions meshed with each other and respectively with a ring gear and with a sun gear fixed to the casing, the ring gear forming the first power path of fixed ratio less than one comprising the first control clutch and the input shaft and the planet carrier forming the second power path in direct drive of fixed ratio equal to one comprising the second control clutch and the third control clutch.

According to another embodiment of this aspect of the invention, the double planetary gearset comprises a three-member planetary gearset having a planet carrier carrying planet pinions meshed with a sun gear and with a ring gear and additional planet pinions meshed with the planet pinions and with an additional sun gear, the first member being constituted by the additional sun gear, the second member being constituted by the ring gear, the third member being constituted by the planet carrier and the fourth member being constituted by the sun gear.

According to another embodiment of this other aspect of the invention, the double planetary gearset comprises a three-member planetary gearset having a planet carrier carrying planet pinions meshed with a sun gear and with a ring gear and another three-member gearset having a planet carrier carrying planet pinions meshed with each other and respectively with a ring gear and a sun gear, the first member being constituted by the sun gear, the second member being constituted by the ring gears fixed together for rotation, the third member being constituted by the planet carriers fixed together for rotation, and the fourth member being constituted by the sun gear.

According to still another embodiment of this aspect of the invention, the input and output shafts being parallel, on the one hand the first power path and the second power path each comprise a parallel gearset, with constant-mesh gearwheels, respectively defining the first fixed speed ratio and the second fixed speed ratio greater than the first ratio and in the same direction, and on the other hand the double planetary gearset comprises a three-member planetary gearset having a planet carrier carrying planet pinions meshed with a sun gear and with a ring gear and another three-member gearset having a planet carrier carrying planet pinions meshed with a sun gear and with a ring gear, the first member being constituted by the ring gear, the second member being constituted by the ring gear and the planet carrier fixed together for rotation, the third member being constituted by the planet carrier and the fourth member being constituted by sun gears fixed together for rotation.

BRIEF DESCRIPTION OF THE DRAWINGS

The features and advantages of the invention will further emerge from the following description given by way of example with reference to the accompanying drawings in which.

DETAILED DESCRIPTION OF THE PREFERRED EMBODIMENTS

Figure 1:
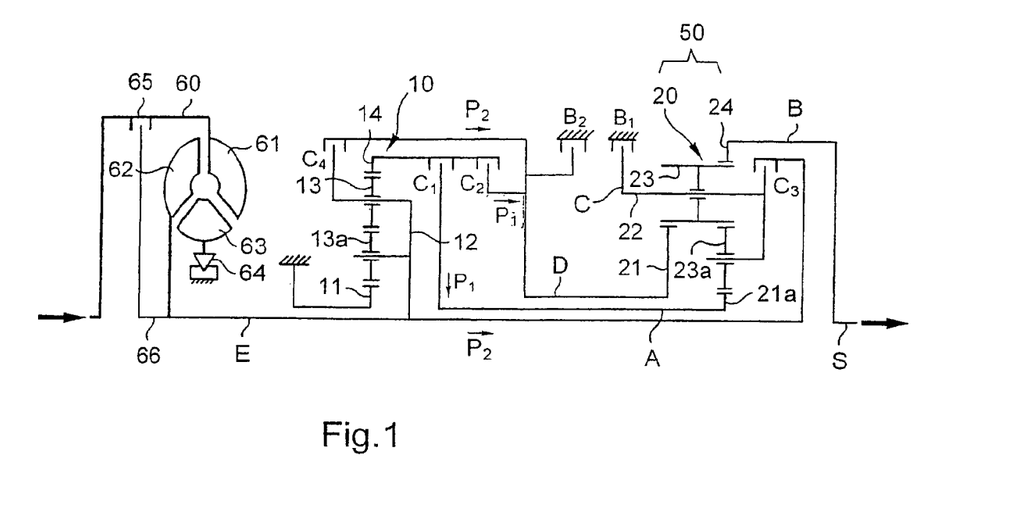
FIG. 1 is a schematic representation of a transmission with eight forward speeds and two rear drives of a first embodiment according to a first aspect of the invention, with the input and output shafts aligned and a first type of double gearset, mounted behind a hydraulic torque converter.

In the first embodiment of FIG. 1, a transmission with eight forward speeds and two reverse drives of a first embodiment according to a first aspect of the invention comprises, in a casing, an input shaft E and an output shaft S which are aligned. In a conventional way, the transmission is represented provided with a hydraulic torque converter 60 comprising an impeller 61, a turbine 62, a stator 63, a freewheel device 64, a lock-up clutch 65 and an output shaft 66 constituting the input shaft E.

This transmission has a planetary gearset 10 with three members comprising a planet carrier 12 fixed to the input shaft E carrying planet pinions 13 and 13a meshed together and respectively with the ring gear 14 driving a first control clutch C1 and a second control clutch C2, and with a sun gear 11 fixed to the casing, defining a first power path P1 having a first fixed speed ratio or reduction ratio G1 less than one.

The input shaft E and the planet carrier 12 respectively drive a third control clutch C3 and a fourth control clutch C4 and define a second power path P2 in direct drive, the second fixed speed ratio G2 being equal to one.

In this first embodiment, the transmission has a double planetary gearset 50 of Ravigneaux type with four members referenced A, B, C, D in the order of their respective speeds comprising a three-member planetary gearset 20 having a planet carrier 22 carrying planet pinions 23 meshed with a sun gear 21 and with a ring gear 24, and additional planet pinions 23a meshed with the planet pinions 23 and with an additional sun gear 21a.

Thus, the first member A is formed by the additional sun gear 21a, the second member B is formed by the ring gear 24, the third member C is formed by the planet carrier 22, and the fourth member D is formed by the sun gear 21. The first member A is associated with the first control clutch C1, the second member B is fixed for rotation with the output shaft S, the third member C is associated with the third control clutch C3 and with a first control brake B1, and the fourth member D is associated with the second control clutch C2, with the fourth control clutch C4 and with a second control brake B2.

Operation is as follows:

In first gear, the first control clutch C1 and the first control brake B1 are engaged. The first member A is driven according to the reduction ratio G1 of the gearset 10 and the third member C is held against rotation. Motion is transmitted according to that speed ratio G1 and the low reduction ratio of the double planetary gearset 50.

In second gear, the first control clutch C1 and the second control brake B2 are engaged. The first member A is driven according to speed ratio G1 and the fourth member D is held against rotation. Motion is transmitted according to speed ratio G1 and the intermediate reduction ratio of the double planetary gearset 50.

In third gear, the first and second control clutches C1 and C2 are engaged. The first and fourth members A and D and the double planetary gearset 50 are driven as a unit according to speed ratio G1. Motion is transmitted at that speed ratio.

In fourth gear, the first and fourth control clutches C1 and C4 are engaged. The first member A is driven according to speed ratio G1 and the fourth member D is driven in direct drive. Motion is transmitted according to a first ratio intermediate between G1 and the direct drive.

In fifth gear, the first and third control clutches C1 and C3 are engaged. The first member A is driven according to speed ratio G1 and the third member C is driven in direct drive. Motion is transmitted according to a second ratio intermediate between G1 and the direct drive.

In sixth gear, the third and fourth control clutches C3 and C4 are engaged. The third and fourth members C and D and the double planetary gearset 50 are driven as a unit in direct drive. Motion is transmitted in direct drive.

In seventh gear, the second and third control clutches C2 and C3 are engaged. The third member C is driven in direct drive and the fourth member D is driven according to speed ratio G1. Motion is transmitted according to a partial overdrive ratio of the double planetary gearset 50.

In eighth gear, the third control clutch C3 and the second control brake B2 are engaged. The third member C is driven in direct drive and the fourth member D is held against rotation. Motion is transmitted according to the complete overdrive ratio of the double planetary gearset 50.

In the braked neutral position, the first and second control brakes B1 and B2 are engaged. The third and fourth members C and D and the double planetary gearset 50 are held stationary as a unit. The output shaft S is held against rotation while the input shaft is free to rotate. No motion is transmitted.

In the first reverse drive, the second control clutch C2 and the first control brake B1 are engaged. The fourth member D is driven according to G1 and the third member C is held against rotation. Motion is transmitted according to that ratio G1 and the reverse drive ratio of the double planetary gearset 50.

In second reverse drive, the fourth control clutch C4 and the first control brake B1 are engaged. The fourth member D is driven in direct drive and the third member C is held against rotation. Motion is transmitted according to the reverse drive ratio of the double planetary gearset 50.

Figure 2:
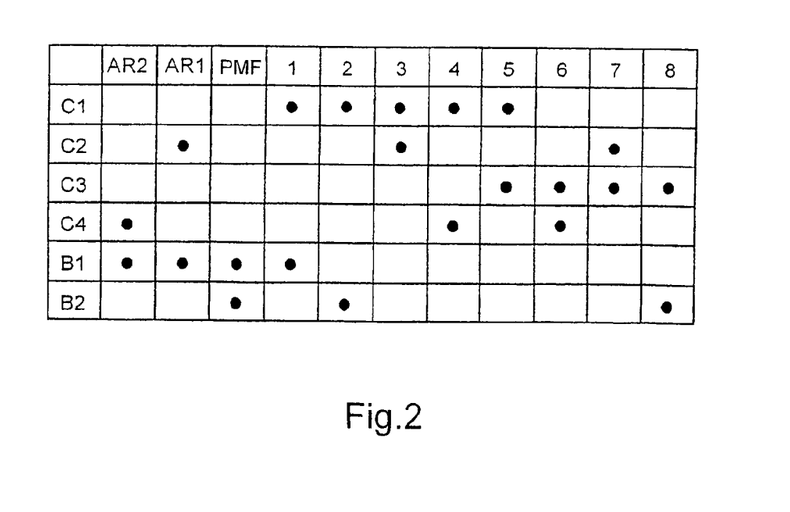
FIG. 2 shows the selective table of the friction members for the transmission with eight forward speeds and two reverse drives according to the first aspect of the invention.

FIG. 2 shows the selective table of the friction members in relation with these eleven operating modes. It will be noted that these eleven modes correspond in fact to the fifteen combinations of pairs of the four control clutches and two control brakes, minus four prohibited combinations for which the input shaft E is held against rotation and the output shaft S released, i.e. those of the of the third control clutch C3 with the first control brake B1, of the second control clutch C2 with the second control brake B2, of the second control clutch C2 with the fourth control clutch C4 and of the fourth control clutch C4 with the second control brake B2. It will also be noted that the change from each combination to the next, or to the one thereafter, or further, is achieved throughout the whole range by changing only one of the two friction members engaged, i.e. exclusively by single transition shifts, which readily lend themselves to any kind of control.

Figure 3:
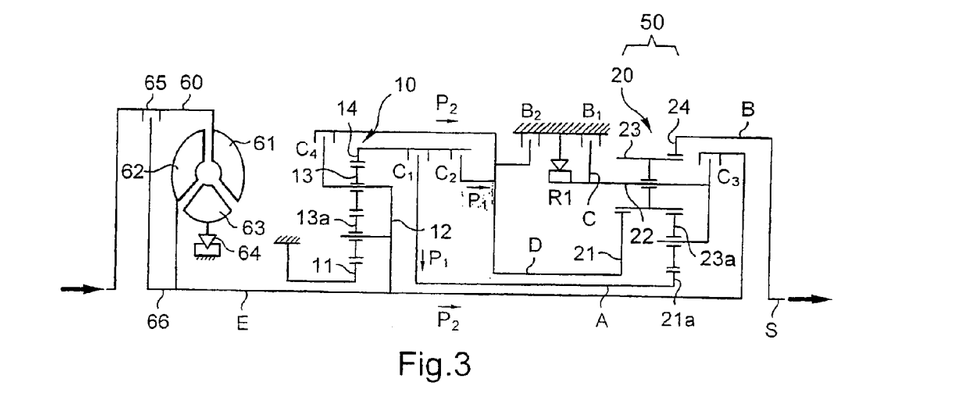
FIG. 3 shows a variant of the transmission of FIG. 1, with the addition of a freewheel device facilitating the gear change from first to second and from second to first.
Figure 4:
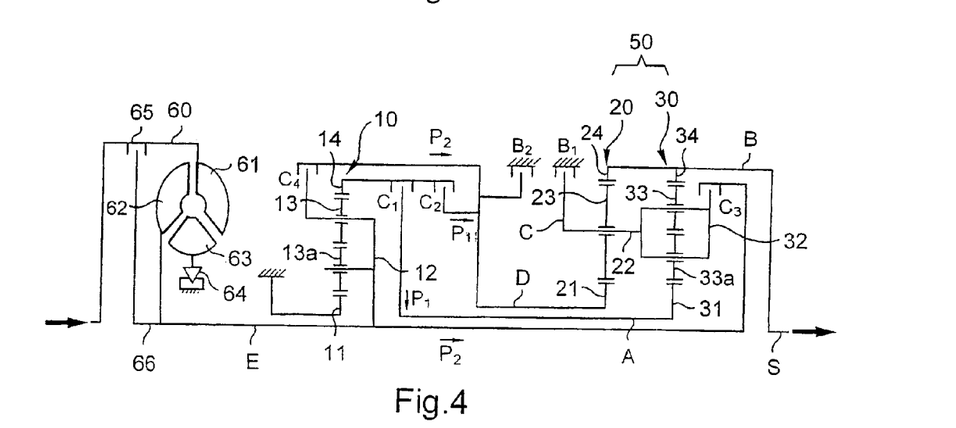
FIG. 4 shows another variant of the transmission of FIG. 1, with a second type of double gearset.
Figure 5:
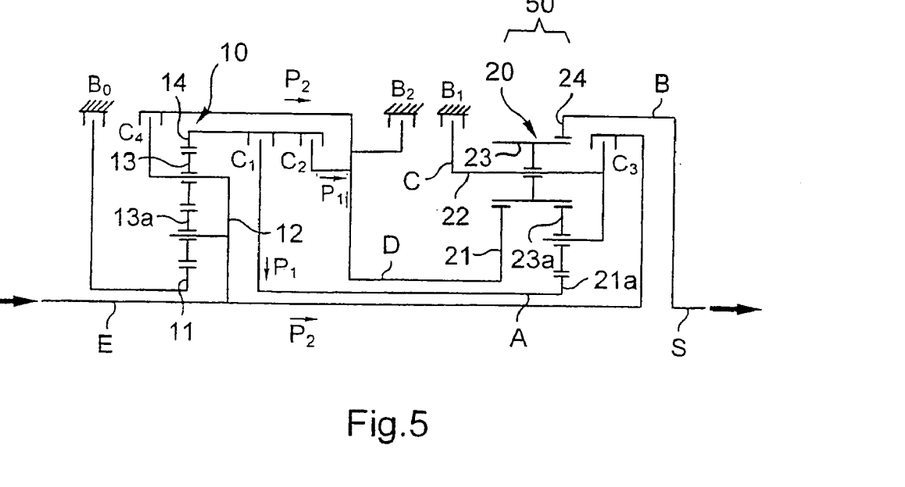
FIG. 5 shows still another variant of the transmission of FIG. 1, with a brake operating as a start-up clutch instead of the torque converter.

Reference will now be made to FIGS. 3, 4, and 5, which represent three respective variants of the transmission with eight forward speeds and two reverse drives of FIG. 1. All parts in common with FIG. 1 or having the same functions keep the same reference numbers.

In a variant of FIG. 3, a freewheel device R1 is added in parallel with the first control brake B1 to facilitate in conventional manner the gear shifts from first to second and from second to first. This freewheel device is in no way involved in the operation which remains identical to that of FIG. 1.

In a variant of FIG. 4, the double planetary gearset 50 is of Simpson type and comprises the three-member gearset 20 of FIG. 1 and another three-member gearset 30 having a planet carrier 32 carrying planet pinions 33 and 33a meshed with each other and respectively with a ring gear 34 and a sun gear 31. The first member A is constituted by the sun gear 31 of the gearset 30, the second member B is constituted by the ring gears 24 and 34 of the gearsets 20 and 30 fixed for rotation together, the third member C is constituted by the planet carrier 22 and 32 of the gearsets 20 and 30 fixed for rotation together, and the fourth member D is constituted by the sun gear 21 of the gearset 20.

Figure 4A:
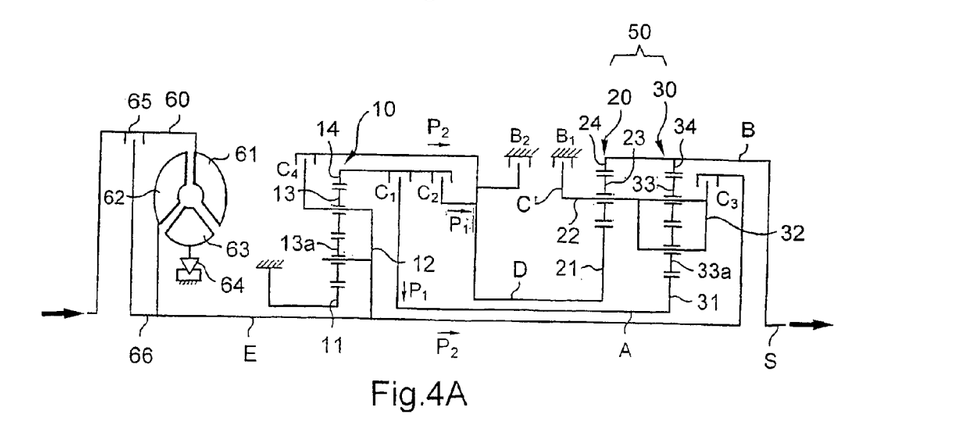
FIG. 4A shows a simplified variant of the embodiment of the transmission of FIG. 4 in which the ring gears of each of the gearsets of the double gearset are equal and the adjacent planet pinions equal and mounted on the same shaft that is common to the two planet carriers.

In the embodiment of FIG. 4A, as in the variant of FIG. 4, the double planetary gearset 50 is of Simpson type and comprises the three-member gearset 20 of FIG. 1 and another three-member gearset 30 having a planet carrier 32 carrying planet pinions 33 and 33a meshed with each other and respectively with a ring gear 34 and a sun gear 31. The first member A is constituted by the sun gear 31 of the gearset 30, the second member B is constituted by the ring gears 24 and 34 of the gearsets 20 and 30 fixed for rotation together, the third member C is constituted by the planet carrier 22 and 32 of the gearsets 20 and 30 fixed for rotation together, and the fourth member D is constituted by the sun gear 21 of the gearset 20. In contrast to the variant of FIG. 4, the ring gears 24 and 34 are equal and the adjacent planet pinions 23 and 33 are equal and mounted on the same shaft common to the two planet carriers 22 and 32, thus providing an overall simplification.

In the third variant of FIG. 5, the torque converter 60 is omitted, and the permanent connection to the casing of the sun gear 11 of the gearset 10 is replaced by a non-permanent connection by means of a brake Bo used as a start-up clutch.

According to this third variant, operation is as follows:

When stopped, the brake $B_0$ is disengaged. The first power path P1 is interrupted and all the speeds which pass therethrough i.e. the first, the second, the third, the fourth, the fifth, the seventh and the first reverse drive are disengaged. Starting is possible in all these speeds while progressively engaging the brake $B_0$ exactly like a conventional start-up clutch, on the sole condition that it is made with appropriate dimensions and that appropriate cooling thereof is ensured. Of course starting is only made practically in first gear and first reverse drive, and possibly in second gear.

When in gear, the brake $B_0$ is engaged for all the forward and reverse speeds, and the operation remains identical to that of FIG. 1.

The examples 1, 2, and 3 below show the excellent progression of steps of the ratios and the remarkable flexibility in the spread of these transmissions with eight forward speeds and two reverse drives, according to the first aspect of the invention.

EXAMPLE 1

FIGS. 1 to 5

| Planetary gearset 10 | | Double gearset 50 (Ravigneaux 20 or Simpson 20, 30) | |
|---|---|---|---|
| Ring gear 14 | 88 teeth | Ring gears 24, 34 | 88 teeth |
| Planet pinions 13 | 17 teeth | Planet pinions 23, 33 | 25 teeth |
| Planet pinions 13a | 15 teeth | Planet pinions 23a, 33a | 23 teeth |
| Sun gear 11 | 46 teeth | Sun gear 21 | 38 teeth |
| Ratio G1 | 0.477 | Sun gears 21a, 31 | 31 teeth |

| Gears | Torques | Steps | |
|---|---|---|---|
| $2^{nd}$ RD | 0.432 | 2.316 | 2.095 |
| $1^{st}$ RD | 0.206 | 4.852 | 1.226 |
| 1 | 0.168 | 5.948 | 1.826 |
| $2^{nd}$ | 0.307 | 3.257 | 1.554 |
| $3^{rd}$ | 0.477 | 2.095 | 1.391 |
| $4^{th}$ | 0.664 | 1.507 | 1.229 |
| $5^{th}$ | 0.816 | 1.226 | 1.226 |
| $6^{th}$ (direct drive) | 1.000 | 1.000 | 1.226 |
| $7^{th}$ | 1.226 | 0.816 | 1.168 |
| $8^{th}$ | 1.432 | 0.698 | |
| | | Spread: 8.52 | |

EXAMPLE 2

FIGS. 1 to 5

| Planetary gearset 10 | | Double gearset 50 (Ravigneaux 20 or Simpson 20, 30) | |
|---|---|---|---|
| Ring gear 14 | 87 teeth | Ring gears 24, 34 | 89 teeth |
| Planet pinions 13 | 17 teeth | Planet pinions 23, 33 | 26 teeth |
| Planet pinions 13a | 15 teeth | Planet pinions 23a, 33a | 25 teeth |
| Sun gear 11 | 42 teeth | | 37 teeth |
| Ratio G1 | 0.517 | Sun gears 21a, 31 | |

| Gears | Torques | Steps | |
|---|---|---|---|
| $2^{nd}$ RD | 0.416 | 2.405 | 1.933 |
| $1^{st}$ RD | 0.215 | 4.650 | 1.156 |
| $1^{st}$ | 0.186 | 5.377 | 1.826 |
| $2^{nd}$ | 0.340 | 2.945 | 1.523 |
| $3^{rd}$ | 0.517 | 1.933 | 1.321 |
| $4^{th}$ | 0.683 | 1.464 | 1.210 |
| $5^{th}$ | 0.826 | 1.210 | 1.210 |
| $6^{th}$ (direct drive) | 1.000 | 1.000 | 1.201 |
| $7^{th}$ | 1.201 | 0.833 | 1.179 |
| $8^{th}$ | 1.416 | 0.706 | |
| | | Spread: 7.61 | |

EXAMPLE 3

FIGS. 1 to 5

|  | Planetary gearset 10 |  | Double gearset 50 (Ravigneaux 20 or Simpson 20, 30) |  |
|---|---|---|---|---|
| Ring gear 14 |  | 87 teeth | Ring gears 24, 34 | 98 teeth |
| Planet pinions 13 |  | 17 teeth | Planet pinions 23 | 32 teeth |
| Planet pinions 13a |  | 15 teeth | Planet pinions 33 | 25 teeth |
| Sun gear 11 |  | 42 teeth | Planet pinions 23a, 33a | 23 teeth |
| Ratio G1 |  | 0.517 | Sun gear 21 | 34 teeth |
|  |  |  | Sun gears 21a, 31 | 38 teeth |
|  | Gears | Torques | Steps |  |
| $2^{nd}$ RD | 0.347 | 2.882 | 1.933 |  |
| $1^{st}$ RD | 0.179 | 5.573 | 0.895 |  |
| $1^{st}$ | 0.201 | 4.986 | 1.833 |  |
| $2^{nd}$ | 0.368 | 2.720 | 1.407 |  |
| $3^{rd}$ | 0.517 | 1.933 | 1.270 |  |
| $4^{th}$ | 0.657 | 1.522 | 1.237 |  |
| $5^{th}$ | 0.813 | 1.230 | 1.230 |  |
| $6^{th}$ (direct drive) | 1.000 | 1.000 | 1.167 |  |
| $7^{th}$ | 1.167 | 0.857 | 1.154 |  |
| $8^{th}$ | 1.347 | 0.742 |  |  |
|  |  | Spread: 6.72 |  |  |

Figure 6:
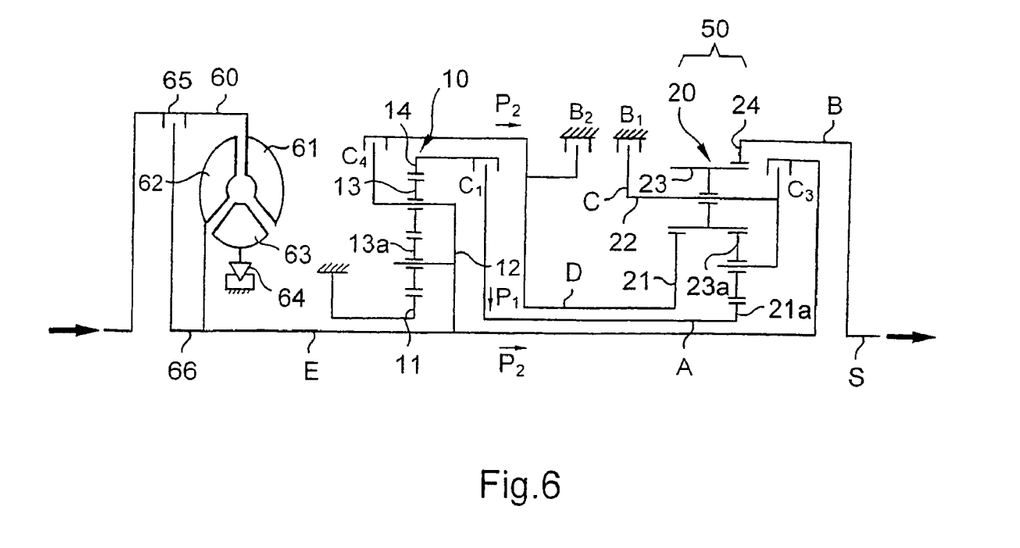
FIG. 6 is a schematic representation of a transmission with six forward speeds and a single reverse drive of a first embodiment according to a second aspect of the invention.

Reference will now be made to FIG. 6 which represents a transmission with six forward speeds and one reverse drive according to a first embodiment of a second aspect of the invention. This transmission adopts the same general architecture as the transmission of FIG. 1, but in which the control clutch C2 and the speeds dependent thereon, i.e. the third, the seventh and the first reverse speed are omitted, so reducing the transmission to six forward speeds and one reverse drive.

The operation of this transmission with six forward speeds and one reverse drive is the following: in first, the first control clutch C1 and the first control brake B1 are engaged. The first member A is driven according to the reduction ratio G1 of the gearset 10 and the third member C is held against rotation. Motion is transmitted according to that speed ratio G1 and the low reduction ratio of the double planetary gearset 50.

In second gear, the first control clutch C1 and the second control brake B2 are engaged. The first member A is driven according to speed ratio G1 and the fourth member D is held against rotation. Motion is transmitted according to speed ratio G1 and the intermediate reduction ratio of the double planetary gearset 50.

In third gear, the control clutches C1 and C4 (here the first and third) are engaged. The first member A is driven according to speed ratio G1 and the fourth member D is driven in direct drive. Motion is transmitted according to a first ratio intermediate between G1 and the direct drive.

In fourth gear, the control clutches C1 and C3 (here the first and second) are engaged. The first member A is driven according to speed ratio G1 and the third member C is driven in direct drive. Motion is transmitted according to a second ratio intermediate between G1 and the direct drive.

In fifth gear, the control clutches C3 and C4 (here the second and third) are engaged. The third and fourth members C and D and the double planetary gearset 50 are driven as a unit in direct drive. Motion is transmitted in direct drive.

In sixth gear, the control clutch C3 (here the second) and the second control brake B2 are engaged. The third member C is driven in direct drive and the fourth member D is held against rotation. Motion is transmitted according to the complete overdrive ratio of the double planetary gearset 50.

In the braked neutral position, the first and second control brakes B1 and B2 are engaged. The third and fourth members C and D and the double planetary gearset 50 are held stationary as a unit. The output shaft S is held against rotation while the input shaft is free to rotate. No motion is transmitted.

In reverse drive, the control clutch C4 (here the third) and the first control brake B1 are engaged. The fourth member D is driven in direct drive and the third member C is held against rotation. Motion is transmitted according to the reverse drive ratio of the double planetary gearset 50.

Figure 9:
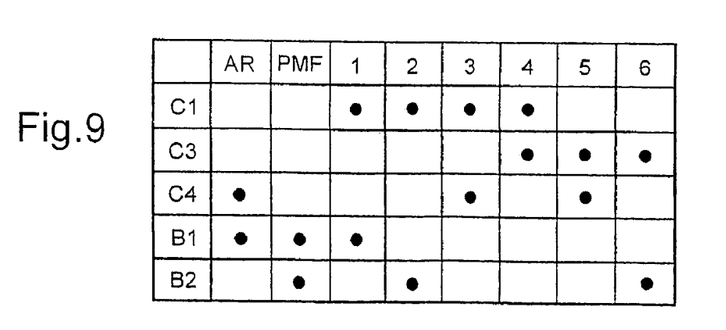
FIG. 9 shows the selective table of the friction members for the transmission with six forward speeds and one reverse drive according to the second aspect of the invention.

The selective table of the friction members thus modified is shown in FIG. 9. All parts in common with FIG. 1 or having the same functions keep the same reference numbers.

Example 4 below shows the still excellent progression of steps of the ratios and the still well-adapted spread of this transmission with six forward speeds and one reverse drive.

EXAMPLE 4

FIG. 6

|  | Planetary gearset 10 |  | Double gearset 50 (Ravigneaux 20 or Simpson 20, 30) |  |
|---|---|---|---|---|
| Ring gear 14 |  | 77 teeth | Ring gears 24, 34 | 86 teeth |
| Planet pinions 13 |  | 15 teeth | Planet pinions 23 | 32 teeth |
| Planet pinions 13a |  | 14 teeth | Planet pinions 33 | 21 teeth |
| Sun gear 11 |  | 41 teeth | Planet pinions 23a, 33a | 20 teeth |
| Ratio G1 |  | 0.468 | Sun gear 21 | 22 teeth |
|  |  |  | Sun gears 21a, 31 | 38 teeth |
|  | Gears | Torques | Steps |  |
| RD | 0.256 | 3.909 | 1.238 |  |
| $1^{st}$ | 0.207 | 4.841 | 1.800 |  |
| $2^{nd}$ | 0.372 | 2.689 | 1.550 |  |
| $3^{rd}$ | 0.576 | 1.735 | 1.326 |  |
| $4^{th}$ | 0.765 | 1.308 | 1.308 |  |
| $5^{th}$ (direct drive) | 1.000 | 1.000 | 1.256 |  |
| $6^{th}$ | 1.256 | 0.796 |  |  |
|  |  | Spread: 6.08 |  |  |

Furthermore, the modifications illustrated and described above with reference to FIGS. 3, 4 and 5 may also be adopted in the transmission with six forward speeds and one reverse drive of FIG. 6.

Figure 7:
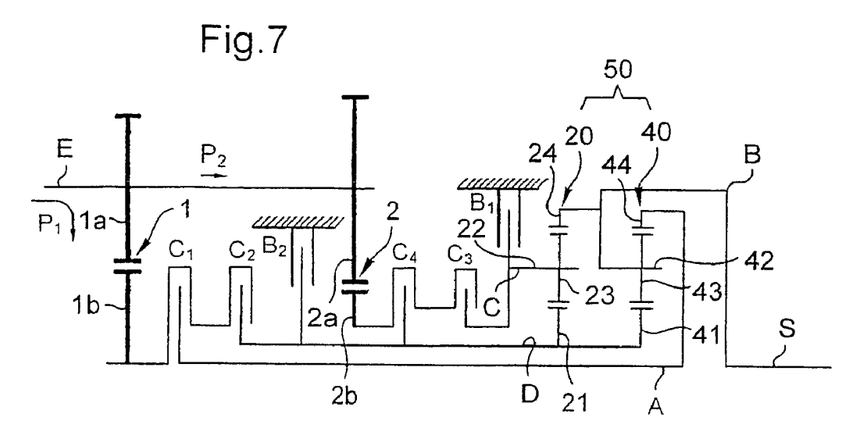
FIG. 7 is a schematic representation of a second embodiment of the transmission with eight forward speeds and two reverse drives in which the input and output shafts are parallel, with a third type of double gearset.

Reference will now be made to FIG. 7 which is a schematic representation of a second embodiment of the transmission with eight forward speeds and two reverse drives according to the first aspect of the invention in which the input shaft E and the output shaft S are parallel. All parts in common with FIGS. 1 and 7 or having the same functions keep the same reference numbers.

This transmission has a first parallel gearset 1 of constant-mesh gearwheels comprising a gearwheel 1a fixed to the input shaft E and a first group gearwheel 1b, first control clutch C1, second control clutch C2, which is mounted concentrically with the output shaft S, constituting the first power path P1 having the first fixed speed ratio G1.

This transmission also has a second parallel gearset 2 of constant-mesh gearwheels comprising a gearwheel 2a fixed to the input shaft E and a second group gearwheel 2b, third control clutch C3, fourth control clutch C4, which is similarly mounted concentrically with the output shaft S, constituting the second power path P2 having the second fixed speed ratio G2 greater than G1 and in the same direction.

In this transmission, the double planetary gearset 50 comprises the three-member gearset 20 of FIG. 1 and another three-member gearset 40 having a planet carrier 42 carrying planet pinions 43 meshed with a sun gear 41 and a ring gear 44. The first member A is constituted by the ring gear 44 of the gearset 40, the second member B is constituted by the planet carrier 42 of the gearset 40 and the ring gear 24 of the gearset 20 fixed for rotation together, the third member C is constituted by the planet carrier 22 of the gearset 20, and the fourth member D is constituted by the sun gears 21 and 41 of the gearsets 20 and 40 fixed for rotation together.

The four members A, B, C, D are associated with the four control clutches C1, C2, C3, and C4 and two control brakes B1, B2 as in FIG. 1. The selective table of FIG. 2 applies without modification and the description of the operation is identical with the single exception of the disappearance of the direct drive which is replaced by the ratio G2.

Example 5 below reproduces example 1 of the first embodiment of the transmission. With very slight differences due to the inevitable constraints of meshing, the spread and the steps are all maintained and the speeds and the torques are all proportional to those of example 1 in the ratios G2 and 1/G2, showing the identical results of this second embodiment of the transmission with eight forward speeds and two reverse speeds, according to the second aspect of the invention.

EXAMPLE 5

FIG. 7

| Parallel gearset 1, 2 | | Double gearset 50 (Simpson 20, 40) | |
|---|---|---|---|
| Gearwheel 1a | 27 teeth | Ring gears 24 | 88 teeth |
| Gearwheel 1b | 51 teeth | Planet pinions 23 | 25 teeth |
| Ratio G1 | 0.529 | Sun gear 21 | 38 teeth |
| Gearwheel 2a | 41 teeth | Ring gear 44 | 81 teeth |
| Gearwheel 2b | 37 teeth | Planet pinions 43 | 18 teeth |
| Ratio G2 | 1.108 | Sun gear 41 | 45 teeth |

| Gears | Torques | Steps |
|---|---|---|
| $2^{nd}$ RD | 0.479 | 2.090 | 2.093 |
| $1^{st}$ RD | 0.229 | 4.374 | 1.227 |
| $1^{st}$ | 0.186 | 5.368 | 1.827 |
| $2^{nd}$ | 0.340 | 2.938 | 1.556 |
| $3^{rd}$ | 0.529 | 1.889 | 1.390 |
| $4^{th}$ | 0.736 | 1.359 | 1.229 |
| $5^{th}$ | 0.905 | 1.106 | 1.225 |
| $6^{th}$ (direct drive) | 1.108 | 0.902 | 1.226 |
| $7^{th}$ | 1.358 | 0.736 | 1.168 |
| $8^{th}$ | 1.587 | 0.630 | |
| | Spread: 8.52 | | |

Figure 8:
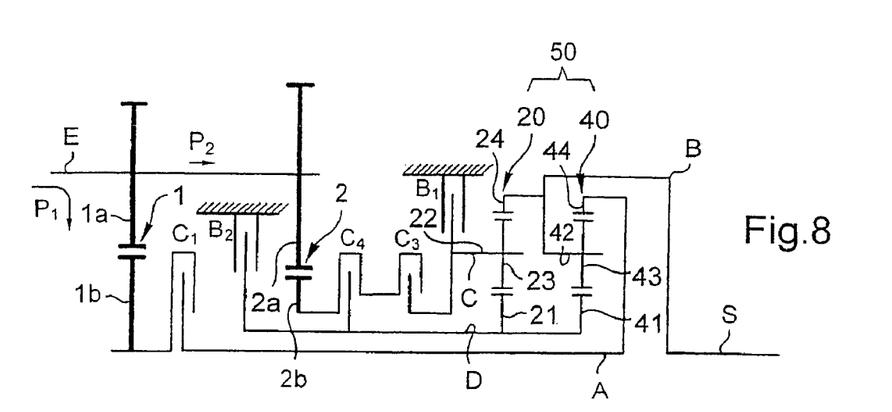
FIG. 8 shows a second embodiment of the transmission with six forward speeds and a single reverse drive.

Reference will now be made to FIG. 8 which represents a second embodiment of the transmission with six forward speeds and one reverse drive, in which, as in FIG. 7, the input shaft (E) and the output shaft (S) are parallel. In this transmission, with respect to that illustrated in FIG. 7, the control clutch C2 and the speeds which depend thereon, i.e. the third, the seventh and the first reverse drive are omitted. The selective table of the friction members is that of FIG. 9. All parts in common with FIG. 7 or having the same functions keep the same reference numbers.

Example 6 below reproduces example 4 of the first embodiment of the transmission with six forward speeds and one reverse drive. With very slight differences due to the inevitable constraints of meshing, the spread and the steps are all maintained and the speeds and the torques are all proportional to those of example 4 in the ratios G2 and 1/G2, showing the identical results of this second embodiment.

EXAMPLE 6

FIG. 8

| Parallel gearset 1, 2 | | Double gearset 50 (Simpson 20, 40) | |
|---|---|---|---|
| Gearwheel 1a | 28 teeth | Ring gears 24 | 86 teeth |
| Gearwheel 1b | 53 teeth | Planet pinions 23 | 32 teeth |
| Ratio G1 | 0.528 | Sun gear 21 | 22 teeth |
| Gearwheel 2a | 43 teeth | Ring gear 44 | 86 teeth |
| Gearwheel 2b | 38 teeth | Planet pinions 43 | 32 teeth |
| Ratio G2 | 1.132 | Sun gear 41 | 22 teeth |

| Gears | Torques | Steps |
|---|---|---|
| RD | 0.289 | 3.455 | 1.236 |
| $1^{st}$ | 0.234 | 4.270 | 1.796 |
| $2^{nd}$ | 0.421 | 2.377 | 1.548 |
| $3^{rd}$ | 0.651 | 1.536 | 1.327 |
| $4^{th}$ | 0.864 | 1.157 | 1.309 |
| $5^{th}$ | 1.132 | 0.884 | 1.256 |
| $6^{th}$ | 1.421 | 0.704 | |
| | Spread: 6.07 | | |

Of course, the invention is not limited to the embodiments described and shown for illustrative purposes only, but encompasses all variations. In particular, other arrangements of the two power paths P1, P2, the two different speed ratios G1, G2, and/or the double planetary gearset 50 will fall within the true spirit and scope of the invention as defined in the appended claims.

The invention claimed is:

1. A multispeed automatic transmission, in particular for automobile vehicles, comprising between an input shaft (E) and an output shaft (S) housed in a casing, a so called double planetary gearset (50), with four members (A, B, C, D) identified from first to fourth in order of speed, concentric with the output shaft (S), two power paths (P1, P2) between the input shaft (E) and the double planetary gearset (50) and five control devices, which respectively comprise three clutches (C1, C2, C3) and two brakes (B1, B2) and of which the selective operation in pairs determines various transmission ratios between the input shaft (E) and the output shaft (S), the first power path (P1) having a first fixed speed ratio (G1) and comprising the first and the second clutches (C1, C2) and the second power path (P2) having a second fixed speed ratio (G2) greater than the first ratio (G1) and in the same direction, and comprising the third clutch (C3), the first member (A) of the double planetary gearset (50) being connected to the first power path (P1) by the first clutch (C1), the second member (B) being fixed to the output shaft (S), the third member (C) being connected to the second power path (P2) by the third clutch (C3) and held against rotation by the first brake (B1), and the fourth member (D) being connected to the first power path (P1) by the second clutch (C2) and held against rotation by the second brake (B2), wherein which transmission comprises a fourth clutch (C4) connecting the fourth member (D) to the second power path (P2) and constituting a sixth control device, such that selective operation in pairs of the six control devices provides eight forward gears: a first, by the first clutch (C1) and the first brake (B1); a second by the first clutch (C1) and the second brake (B2) ; a third by the first and second clutches (C1, C2); a fourth by the first and fourth clutches (C1, C4); a fifth by the first and third clutches (C1, C3); a sixth in direct drive by the third and fourth clutches (C3, C4); a seventh by the second and third clutches (C2, C3) ; an eighth by the third clutch (C3) and the second brake (B2); a braked neutral position by the first and second brakes (B1, B2); a first reverse drive by the second clutch (C2) and the first brake (B1); and a second reverse drive by the fourth clutch (C4) and the first brake (B1).

2. A transmission according to claim 1, wherein the double planetary gearset (50) comprises a threemember planetary gearset (20) having a planet carrier (22) carrying planet pinions (23) meshed with a sun gear (21) and with a ring gear (24), and additional planet pinions (23a) meshed with the planet pinions (23) and with an additional sun gear (21a), the first member (A) comprising the additional sun gear (21a), the second member (B) comprising the ring gear (24), the third member (C) comprising the planet carrier (22), and the fourth member (D) being constituted by the sun gear (21)

3. A transmission according to claim 1, wherein the double planetary gearset (50) comprises a first threemember planetary gearset (20) having a planet carrier (22) carrying planet pinions (23) meshed with a sun gear (21) and with a ring gear (24), and a second threemember gearset (30) having a planet carrier (32) carrying planet pinions (33) and (33a) meshed with each other and respectively with a ring gear (34) and a sun gear (31), the first member (A) comprising the sun gear (31) of the second threemember gearset, the second member (B) comprising the ring gears (24) and (34) of the first and second threemember gearsets fixed together for rotation, the third member (C) comprising the planet carriers (22 ) and (32) of the first and second threemember gearsets fixed together for rotation, and the fourth member (D) comprising the sun gear (21)of the first threemember gearset.

4. A transmission according to claim 1, further comprising a freewheel device (R1) disposed in parallel with the first control brake (B1)

5. A transmission according to claim 1, further comprising a hydraulic converter having an output shaft (66) constituting the input shaft (E).

6. A transmission according to claim 1, wherein the input (E) and output (S) shafts being aligned, the first power path (P1) comprises a threemember planetary gearset (10), one of the threemember gearset is fixed to the casing, defining the first fixed speed ratio (G1) less than one, and the second power path (P2) is in direct drive defining the second fixed speed ratio (G2) equal to one.

7. A transmission according to claim 6, wherein the threemember planetary gearset (10) comprises a planet carrier (12) fixed to the input shaft (E) carrying planet pinions (13) and (13a) meshed with each other and respectively with a ring gear (14) and with a sun gear (11) fixed to the casing, the ring gear (14) forming the first power path of fixed ratio (G1) less than one comprising the first control clutch (C1) and the second control clutch (C2), and the input shaft (E) and the planet carrier (12) forming the second power path (P2) in direct drive of fixed ratio (G2) equal to one comprising the third control clutch (C3) and the fourth control clutch (C4).

8. A transmission according to claim 6, wherein the threemember planetary gearset (10) comprises a planet carrier (12) fixed to the input shaft (E) carrying planet pinions (13) and (13a) meshed with each other and respectively with a ring gear (14) and with a sun gear (11) connected to a control brake (Bo) for the control of the first power path (P1), the ring gear (14) forming that first power path (P1) of fixed ratio (G1) less than one comprising the first control clutch (C1) and the second control clutch (C2), and the input shaft (E) and the planet carrier (12) forming the second power path (P2) in direct drive of fixed ratio (G2) equal to one comprising the third control clutch (C3) and the fourth control clutch (C4).

9. A transmission according to claim 1, wherein the input (E) and output shafts (S) being parallel, the first power path (P1) and the second power path (P2) each comprise a parallel gearset (1), (2), with constant mesh gearwheels, respectively defining the first fixed speed ratio (G1) and the second fixed speed ratio (G2) greater than the first ratio (G1) and in the same direction.

10. A transmission according to claim 9, wherein the double planetary gearset (50) comprises a first threemember planetary gearset (20) having a planet carrier (22) carrying planet pinions (23) meshed with a sun gear (21) and with a ring gear (24) and a second threemember gearset (40) having a planet carrier (42) carrying planet pinions (43) meshed with a sun gear (41) and with a ring gear (44), the first member (A) comprising the ring gear (44), the second member (B) comprising the ring gear (24)of the first threemember gearset and the planet carrier (42) of the second threemember gearset fixed together for rotation, the third member (C) comprising the planet carrier (22) of the first threemember gearset and the fourth member (D) comprising the sun gears (21) and (41)of the first and second threemember gearset fixed together for rotation.

11. A multispeed automatic transmission, in particular for automobile vehicles, comprising between an input shaft (E) and an output shaft (S) housed in a casing, a so called double planetary gearset (50), with four members identified from first to fourth (A, B, C, D) in order of speed, concentric with the output shaft (S), two power paths (P1, P2) between the input shaft (E) and the double planetary gearset (50) and five control devices, which respectively comprise three clutches (C1, C3, C4) and two brakes (B1, B2)and of which the selective operation in pairs determines various transmission ratios between the input shaft (E) and the output shaft (S), the first power path (P1) having a first fixed speed ratio (G1) and comprising the first clutch (C1), and the second power path (P2) having a second fixed speed ratio (G2) greater than the first ratio (G1) and in the same direction and comprising the second clutch (C3), the first member (A) of the double planetary gearset (50) being connected to the first power path (P1) by the first clutch (C1), the second member (B) being fixed to the output shaft (S), the third member (C) being connected to the second power path (P2) by the second clutch (C3) and held against rotation by the first brake (B1), and the fourth member (D) being held against rotation by the second brake (B2) and connected to one of the two power paths by the third clutch (C4), so as to obtain by selective operation in pairs of the five control devices, six forward gears: a first, by the first clutch (C1) and the first brake (B1); a second by the first control clutch (C1) and the second brake (B2); a third by the first and third clutches (C1, C4); a fourth by the first and second clutches (C1, C3) ; a fifth in direct drive by the second and third clutches (C3, C4); a sixth by the second clutch (C3) and the second brake (B2); a braked neutral position by the first and second brakes (B1, B2); and a reverse drive by the third clutch (C4) and the first brake (B1), wherein the fourth member (D) is connected to the second power path (P2) by the third clutch (C4)

12. A transmission according to claim 11, wherein the double planetary gearset (50) comprises a threemember planetary gearset (20) having a planet carrier (22) carrying planet pinions (23) meshed with a sun gear (21) and with a ring gear (24), and additional planet pinions (23a) meshed with the planet pinions (23) and with an additional sun gear (21a), the first member (A) comprising the additional sun gear (21a), the second member (B) comprising the ring gear (24), the third member (C) comprising the planet carrier (22), and the fourth member (D) comprising the sun gear (21).

13. A transmission according to claim 11, wherein the input (E) and output (S) shafts being aligned, the first power path (P1) comprises a threemember planetary gearset (10), one of the members of the three member gearset is fixed to the casing, defining the first fixed speed ratio (G1) less than one, and the second power path (P2) is in direct drive defining the second fixed speed ratio (G2) equal to one.

14. A transmission according to claim 13, wherein the threemember planetary gearset (10) comprises a planet carrier (12) fixed to the input shaft (E) carrying planet pinions (13) and (13a) meshed with each other and respectively with a ring gear (14) and with a sun gear (11) fixed to the casing, the ring gear (14) forming the first power path of fixed ratio (G1) less than one comprising the first control clutch (C1) and the input shaft (E) and the planet carrier (12) forming the second power path (P2) in direct drive of fixed ratio (G2) equal to one comprising the second control clutch (C3) and the third control clutch (C4).

15. A transmission according to claim 11, wherein the input (E) and output shafts (S) being parallel, the first power path (P1) and the second power path (P2) each comprise a parallel gearset (1), (2), with constant mesh gearwheels, respectively defining the first fixed speed ratio (G1) and the second fixed speed ratio (G2) greater than the first ratio (G1) and in the same direction.

16. A transmission according to claim 15, wherein the double planetary gearset (50) comprises a first threemember planetary gearset (20) having a planet carrier (22) carrying planet pinions (23) meshed with a sun gear (21) and with a ring gear (24) and a second threemember gearset (40) having a planet carrier (42) carrying planet pinions (43) meshed with a sun gear (41) and with a ring gear (44), the first member (A) comprising the ring gear (44) of the second threemember gearset, the second member (B) comprising the ring gear (24) of the first threemember gearset and the planet carrier (42) of the second threemember gearset fixed together for rotation, the third member (C) comprising the planet carrier (22) of the first threemember gearset and the fourth member (D) sun gears (21) and (41) of the first and second threemember gearsets fixed together for rotation.

* * * * *